US012113628B2

United States Patent
Nilsson et al.

(10) Patent No.: US 12,113,628 B2
(45) Date of Patent: Oct. 8, 2024

(54) HYBRID AUTOMATIC REPEAT REQUEST (ARQ) WITH SPATIAL DIVERSITY

(71) Applicant: Telefonaktiebolaget LM Ericsson (publ), Stockholm (SE)

(72) Inventors: Magnus Nilsson, Lund (SE); Jan Celander, Malmö (SE); Martin Isberg, Lund (SE); Magnus Sandgren, Staffanstorp (SE); Torsten Carlsson, Lund (SE); Peter Jakobsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 38 days.

(21) Appl. No.: 17/920,490

(22) PCT Filed: Apr. 24, 2020

(86) PCT No.: PCT/EP2020/061527
§ 371 (c)(1),
(2) Date: Oct. 21, 2022

(87) PCT Pub. No.: WO2021/213679
PCT Pub. Date: Oct. 28, 2021

(65) Prior Publication Data
US 2023/0155742 A1    May 18, 2023

(51) Int. Cl.
*H04L 1/1825* (2023.01)
*H04B 7/024* (2017.01)
*H04B 7/06* (2006.01)

(52) U.S. Cl.
CPC ........... *H04L 1/1825* (2013.01); *H04B 7/024* (2013.01); *H04B 7/0608* (2013.01)

(58) Field of Classification Search
CPC ...... H04L 1/1825; H04B 7/024; H04B 7/0608
See application file for complete search history.

(56) References Cited

U.S. PATENT DOCUMENTS

| 2009/0028091 A1* | 1/2009 | Dimou ................. H04L 1/1825 370/328 |
| 2021/0258855 A1* | 8/2021 | Bartell ..................... H04L 45/02 |
| 2021/0274423 A1* | 9/2021 | Bartell ................... H04W 24/02 |

FOREIGN PATENT DOCUMENTS

| EP | 1798898 A1 * | 6/2007 | ............ H04W 48/20 |
| EP | 2061173 A1 | 5/2009 | |

(Continued)

OTHER PUBLICATIONS

Interdonato, Giovanni, "Signal Processing Aspects of Cell-Free Massive MIMO", Linkoping Studies in Science and Technology Licentiate Thesis No. 1817, Licentiate Thesis, Linkoping University, Sep. 21, 2018, 49 pages.

*Primary Examiner* — Samir W Rizk
(74) *Attorney, Agent, or Firm* — Murphy, Bilak & Homiller, PLLC

(57) ABSTRACT

A wireless system comprises a controlling node and two or more antenna processing nodes coupled to the controlling node but separated from each other. The controlling node sends (720) a command to a first one of the two or more antenna processing nodes, instructing the first one of the two or more antenna processing nodes to transmit data to a wireless device. This may be preceded by selecting (715) the first one of the antenna processing nodes based on an estimated signal quality metric corresponding to the wireless device for each antenna processing node. In response to a determination by the controlling node that the wireless device has not successfully decoded the data, the controlling node sends (730) a command to a second one of the two or more antenna processing nodes, instructing the second one of the antenna processing nodes to transmit the data to the wireless device.

20 Claims, 8 Drawing Sheets

(56) References Cited

FOREIGN PATENT DOCUMENTS

| JP | 2018182660 A | 11/2018 | | |
|---|---|---|---|---|
| TW | 201541891 A | 11/2015 | | |
| WO | WO-2021141770 A1 * | 7/2021 | ............ | G06K 9/6222 |
| WO | WO-2021263283 A1 * | 12/2021 | ............ | H04W 64/00 |
| WO | WO-2022133367 A1 * | 6/2022 | ............ | H04L 1/1812 |

\* cited by examiner

HYBRID AUTOMATIC REPEAT REQUEST (ARQ) WITH SPATIAL DIVERSITY

The present disclosure generally relates to wireless systems in which a central processing unit for a base station is coupled to a series of spatially separated transmitting and receiving antenna points via serial interfaces. The present disclosure relates more particularly to handling retransmissions in such wireless systems.

BACKGROUND

The term "cell-free massive MIMO" has been used to refer to a massive Multiple-Input Multiple-Output (MIMO) system where some or all of the transmitting and receiving antennas for a base station are geographically distributed, apart from the base station. Each of the transmitting and receiving points may be referred to as an "antenna point," "antenna processing node," or "antenna processing unit." These terms may be understood to be interchangeable for the purposes of the present disclosure, with the abbreviation "APU" being used herein. These APUs are communicatively coupled to and controlled by a controlling node, which is spatially separate from some or all of the APUs, may be referred to interchangeably as a "central processing node" or "central processing unit"—the abbreviation "CPU" is used herein.

FIG. 1 provides a conceptual view of a cell-free massive MIMO deployment, comprising a CPU 20 connected to several APUs 22, via serial links 10. As seen in the figure, each of several user equipments (UEs) 115 may be surrounded by one or several serving APUs 22, all of which may be attached to the same CPU 20, which is responsible for processing the data received from and transmitted by each APU. Each UE 115 may thus move around within this system without experiencing cell boundaries.

Systems described herein include at least CPU and two or more APUs spatially separated from each other and from the CPU. These systems, which may be considered examples of cell-free massive MIMO deployments, will be called distributed wireless systems herein. FIGS. 2 and 3 provide other views of example deployments of distributed wireless systems. In this scenario shown in FIG. 2, multiple APUs 22 are deployed around the perimeter of a room, which might be a manufacturing floor or a conference room, for example. Each APU 22 is connected to the CPU 20 via a "strip," or "stripe." More particularly, the CPU 20 in this example deployment is connected to two such stripes, each stripe comprising a serial concatenation of several (10, in the illustrated example) APUs 22. FIG. 3 shows an two-dimensional model of a factory floor with densely populated APUs 22 connected to the CPU 20 via several such "stripes" As a general matter, the CPU 20 can target a UE anywhere in the room by controlling one or several APUs 22 that are closest to the UE to transmit signals to and receive signals from the UE. In this example deployment, the APUs are spaced at 10 meters, in both x- and y-directions, which means that a UE is never more than about 7 meters away from one (or several) APUs, in the horizontal dimension.

It will be appreciated that the distribution of base station antennas into APUs as shown in FIGS. 1-3 can provide for shorter distances between the base station antennas and the antenna(s) for any given UE served by the base station, in many scenarios. This will be an enabler for the use of higher carrier frequencies, and thereby higher modulation/information bandwidths, both of which are key expectations for fifth-generation (5G) wireless networks.

Another requirement of 5G networks is that they support a high quality-of-service (QoS). To achieve this, it is necessary that the radio link between the mobile/device/machine (UE) and the base station be highly reliable and support low-latency communications. This is especially the case for industrial scenarios, for example, where mission-critical real-time communication is needed for communications with or between machines equipped with devices.

In conventional wireless systems, if a transmission from a base station to a wireless device cannot be decoded by the wireless device, the problem is typically resolved by the wireless device asking the base station to transmit the information again, e.g., by sending a negative acknowledgement (NACK) to the base station. The retransmission by the base station can be done with new coding, or with the same coding used for the first transmission. However, this conventional approach may not be optimal for distributed wireless systems as generally described above.

SUMMARY

The present disclosure describes techniques for reducing the need for retransmissions by a wireless device when operating in a distributed wireless system like those generally described above.

An example method, according to some embodiments, is carried out in a controlling node of a distributed wireless system that comprises the controlling node and two or more antenna processing nodes communicatively coupled to the controlling node but spatially separated from each other and from the controlling node. This example method comprises sending a first command to a first one of the two or more antenna processing nodes, the first command instructing the first one of the two or more antenna processing nodes to transmit first data to a wireless device, and, responsive to determining that the wireless device has not successfully decoded the first data, sending a second command to a second one of the two or more antenna processing nodes, the second command instructing the second one of the two or more antenna processing nodes to transmit the first data to the wireless device. If the wireless device remains unable to decode the first information, the controlling node may send an instruction to one or more additional antenna processing nodes to transmit the first data to the wireless device, in some embodiments.

Another example method, according to some embodiments, is carried out in an antenna processing node of a distributed wireless system that comprises a controlling node, the antenna processing node, and one or more additional antenna processing nodes, where each of the antenna processing nodes are communicatively coupled to the controlling node but are spatially separated from each other and from the controlling node. This example method comprises receiving, from the controlling node, information corresponding to first data for transmission to a wireless device in a first interval, and storing the information corresponding to the first data, without transmitting it to the wireless device in the first interval. This method further comprises receiving, after the first interval has passed, a command instructing the antenna processing node to transmit the first data to the wireless device in a second interval, and transmitting the first data to the wireless device in the second interval.

Another example method, according to some embodiments, is also carried out in an antenna processing node of a distributed wireless system that comprises a controlling node, the antenna processing node, and one or more additional antenna processing nodes, where each of the antenna processing nodes are communicatively coupled to the controlling node but are spatially separated from each other and from the controlling node. This example method comprises receiving, from the controlling node, information corresponding to first data for transmission to a wireless device in a first interval, and storing the information corresponding to the first data, without transmitting it to the wireless device in the first interval. This method further comprises receiving, after the first interval has passed, signaling indicating that information corresponding to the first data may be discarded, and discarding the stored information corresponding to the first data, without transmitting it to the wireless device.

Details and variants of the methods summarized above are provided below. Further, controlling node apparatuses and antenna processing node apparatuses configured to carry out the methods summarized above and variants thereof are described in the detailed description below, and illustrated in the attached figures.

DETAILED DESCRIPTION

There are several possible approaches for implementing the interconnections between the CPU in a distributed wireless system and the APUs that it controls. One approach is to implement the interconnections between the CPUs and the APUs as a high-speed digital interface, e.g., such as a high-speed Ethernet connection. With this approach, information to be transmitted by a given APUs is sent from the CPU to the APU as digital baseband information. This digital baseband information is then up-converted to a radiofrequency (RF) signal in the APU, for transmission over the air. In the other direction, RF signals received from a UE are downconverted in the APU and converted to digital form before being sent over the digital link to the CPU, for further processing.

Figure 1:
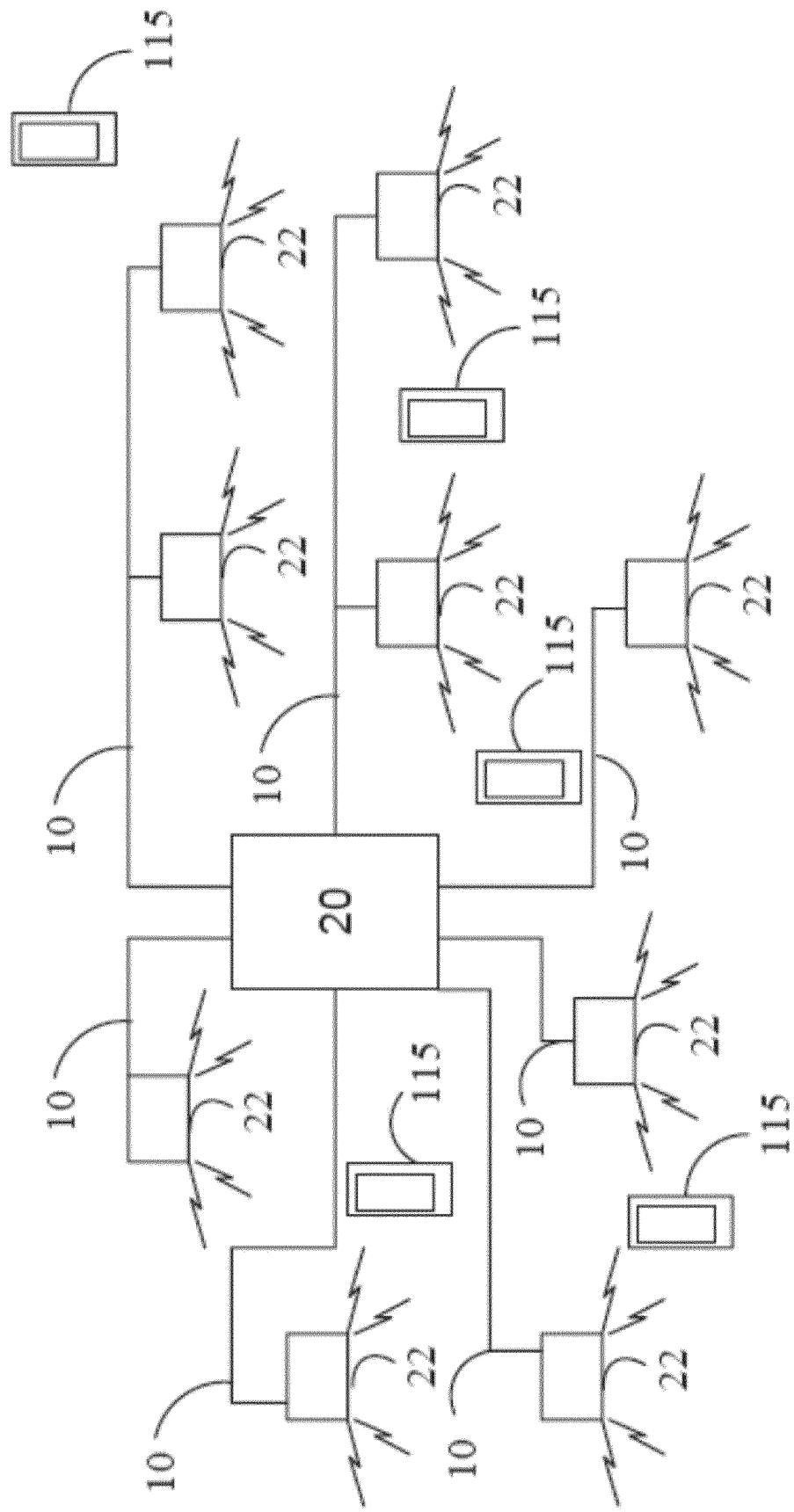
FIG. 1 is an illustration of an example cell-free massive MIMO system.
Figure 2:
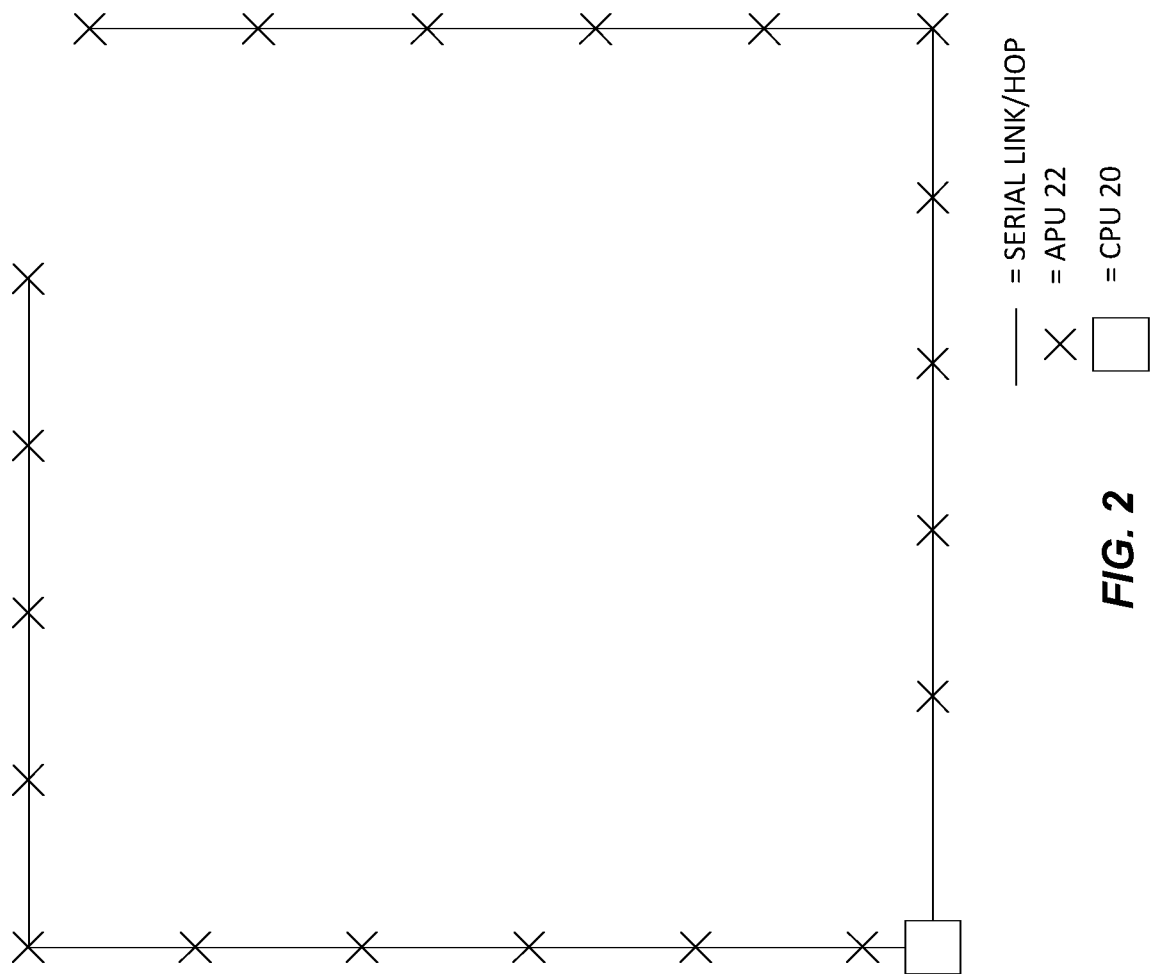
FIG. 2 illustrates an example deployment of a distributed wireless system.
Figure 3:
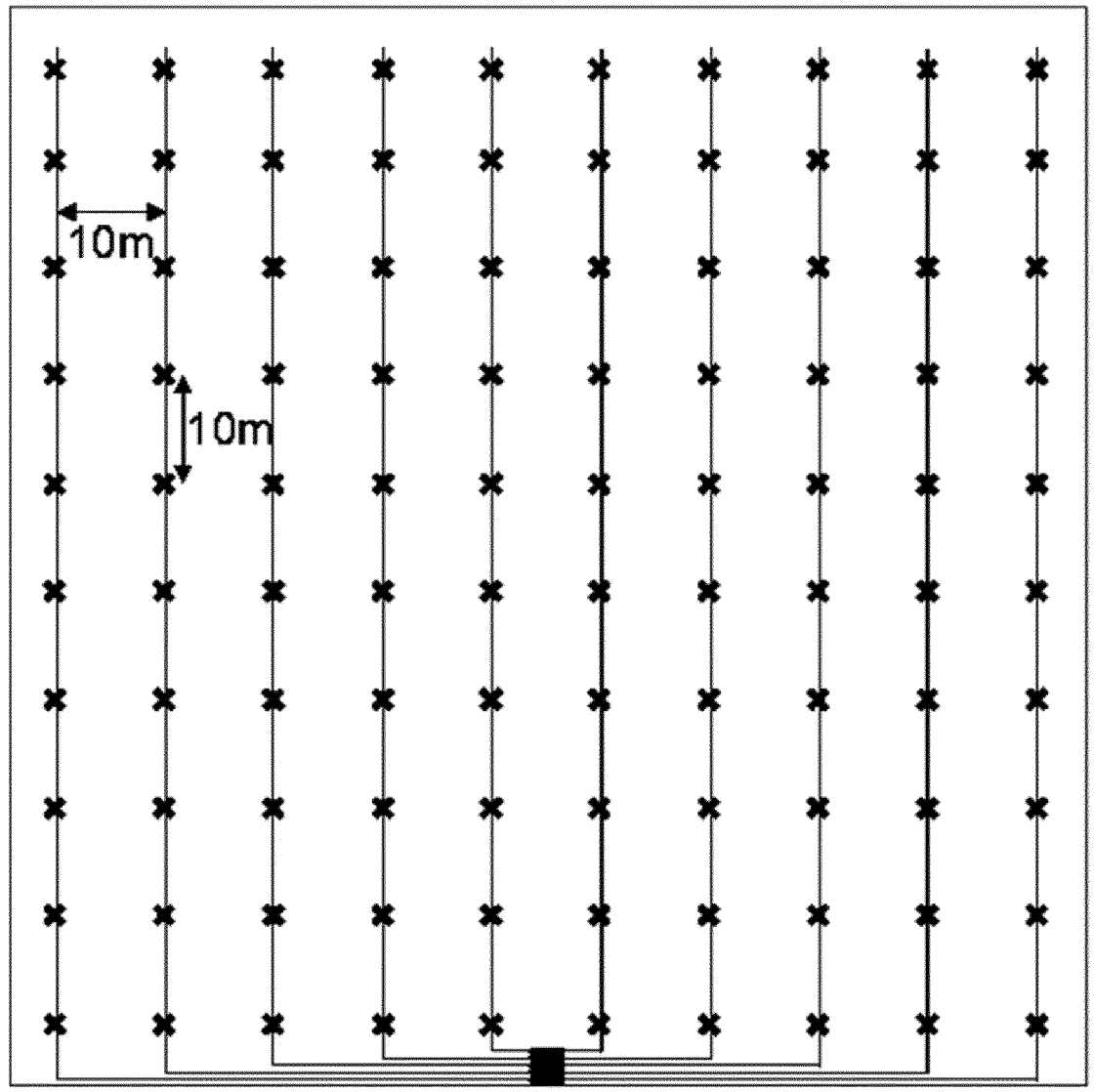
FIG. 3 illustrates another example deployment of a distributed wireless system.

Another approach is to implement each link, or "hop," along the stripes shown in FIG. 2 as a dielectric waveguide that carries a high-frequency RF signal (e.g., a millimeter-wave signal). As a general matter, this term may include any sort of dielectric waveguide, which would include such things as conventional RF waveguides, which are metallic pipes and in which the dielectric substance within the pipe is often simply air. However, more cost-effective solutions have been developed for short- and medium-range applications; these solutions may comprise an inexpensive plastic dielectric that is metallized, e.g., so as to form a "pipe" surrounding the dielectric material or so as to form two parallel plates separated by the dielectric material. These inexpensive dielectric waveguides may provide suitable performance over links that are several meters, or even dozens of meters, long.

Figure 4:
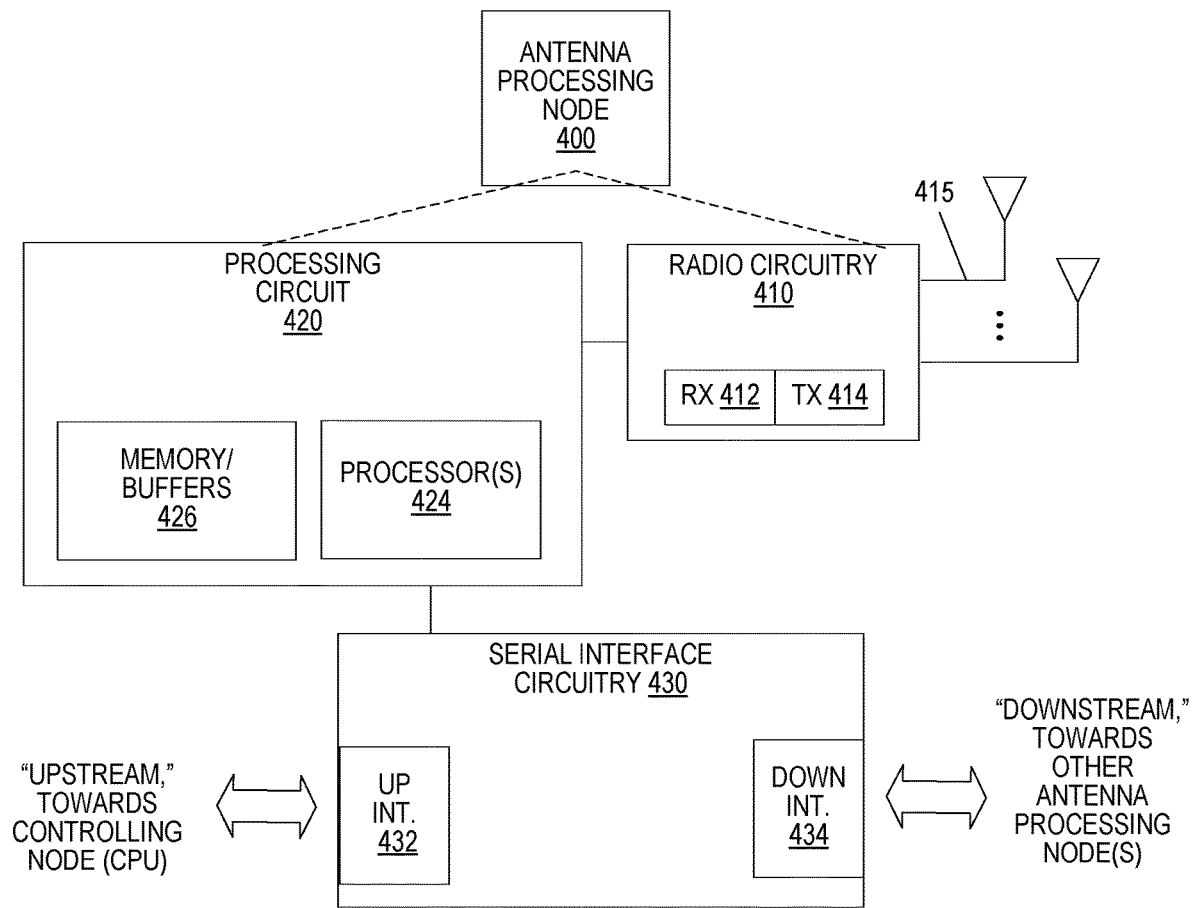
FIG. 4 is a block diagram of an example antenna processing node, according to some embodiments.

The techniques disclosed herein are described in the context of the first approach described above, i.e., in systems where a CPU is connected to multiple APUs via a series of serial links. However, these techniques are not necessarily limited to this approach. In such a system, communications along these serial links may be described as "upstream" and "downstream" communications, where upstream communications are communications in the direction towards the CPU while downstream communications are in the opposite direction, i.e., away from the CPU. In the upstream direction, each APU thus sends its own data towards the CPU, via an upstream serial interface, along with any data that it receives from one or more APUs that are further downstream, via a downstream serial interface. This is seen in FIG. 4, which is a block diagram illustrating components of an example APU, here illustrated as antenna processing node 400. As seen in the figure, the antenna processing node 400 also receives communications for itself and for downstream APUs from the CPU, via the upstream serial interface 432, and forwards those communications intended for downstream APUs towards those APUs, via the downstream serial interface 434.

The required capacity of the fronthaul network formed by these serial links is proportional to the number of simultaneous data streams that the APUs in the series can spatially multiplex, at maximum network load. The required capacity of the backhaul of the CPU (i.e., the CPUs connection towards the core network) is the sum of the data streams that the serial links connecting the APUs to the CPUs will transmit and receive at maximum network node. The most straightforward way to limit these capacity requirements is to constrain the number the number of UEs that can be served per APU and CPU. Put another way, the capacity of the distributed wireless system to serve UEs may be limited by the maximum capacities of the serial links between the APUs to the CPUs.

The use of serial interfaces as described above is generally a good match for downlink (DL) communications, i.e., communications from a base station to one or more UEs. Note that the terms "wireless device," "user equipment," and "UEs" are used herein to refer to any wireless devices served by the distributed wireless systems described here, including wireless devices that do not have a "user" as such but that are connected to machines. The serial interfaces described here work well for downlink communications because the same information may be sent to all of the APUs involved in any given transmission to a wireless device. This downlink information may be the bits or data blocks that must be transmitted by the APUs, with each APU involved in the transmission separately performing its own coding, modulation, upconversion, and transmission. There are other possibilities, however, such as the CPU sending to the APUs a time-domain digital representation of a modulated in-phase/quadrature (I/Q) signal, for upconversion and transmission, or the CPU sending to the APUs a frequency-domain digital representation of I/Q symbols, for OFDMA modulation, upconversion, and transmission by the APUs. In any of these cases, when the CPU sends this downlink information to two or more APUs in the chain, it need only send one copy, with each APU forwarding the information further downstream, as necessary.

Generally, it is desirable to keep the number of simultaneously active (i.e., transmitting) APUs as low as possible, to minimize power consumption and interference. Thus, while transmitting the same data to a wireless device from multiple APUs, e.g., using transmit diversity with different coding from each APU, could provide better signal coverage, it is desirable to minimize redundant transmissions.

Figure 5:
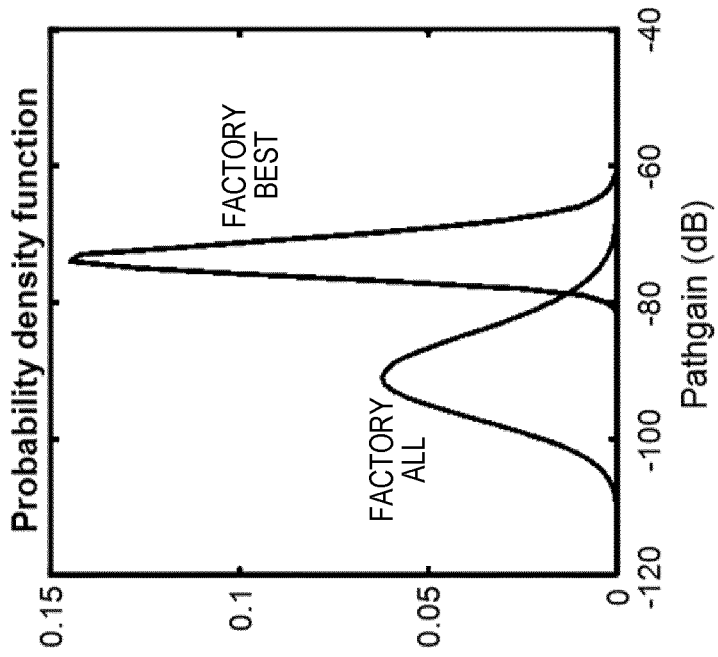
FIG. 5 illustrates a simulation of a factory floor deployment of a distributed wireless system.
Figure 5:
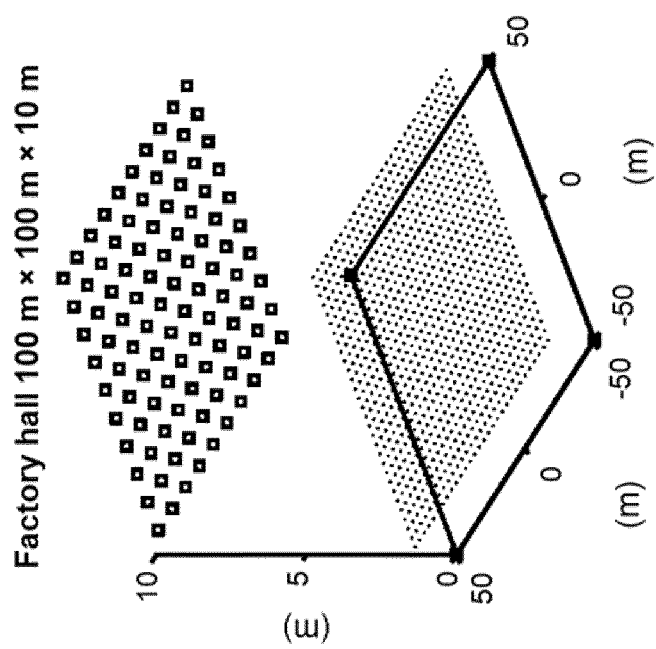

In many deployments of distributed wireless systems, moreover, it will likely be the case that, the majority of the time, the signal received by a wireless device from at least one of the APUs alone is of sufficient quality (i.e., subjected to a sufficiently low path loss) that the DL data can be decoded by the wireless device without error. This is illustrated in FIG. 5, which shows a simulation of path loss from each of several APUs to a UE at each of the positions represented by dots at the lower portion of the left-hand part of the figure. The right-hand portion of the figure shows a probability density function for the path-gains of links from all APUs to all UE positions outlined, as well as a probability density function for the path-gain of the link from the best APU to each UE position. According to this simulation, selecting the APU with the lowest pathloss, which can be done by the CPU based on signal quality measurements reported to the CPU from the APUs, results in a nearly 100% probability that the pathloss from that APU to the wireless device is equal to the free space pathloss.

Of course, for applications where ultra-high reliability is necessary, "nearly 100% probability" is not enough. Further, the signal conditions between a UE and a given APU may change over time, e.g., when an object or person moves around the environment, blocking the signal from the APU, meaning that the most recently received signal quality reports may not always be accurate. This means that if the CPU controls only the "best" APU to transmit the data to the wireless device, the received signal may not always be of sufficient quality to yield a successful decoding by the wireless device of the downlink transmission, in which case the wireless device will transmit a NACK or fail to acknowledge the transmission.

In a conventional system, when a wireless device transmits a NACK, the transmitting base station can re-transmit the downlink data, one or more times. Various techniques whereby the wireless device combines information from the original transmission and one or more re-transmissions to improve the probability of a successful decoding are well known—these include so-called Chase combining, where the original transmission and re-transmission include the same information and the wireless device uses maximum-ratio combining (MRC) to improve the effective signal-to-noise ratio, and incremental redundancy, where each re-transmission is coded differently, in such a way that each re-transmission provides additional information to the receiver.

Just as in conventional systems, in a distributed wireless system like those described above it may sometimes be the case that an interfering object between a transmitting APU and the target wireless device causes a higher path loss or fading in the channel, such that a retransmission is requested by the targeted wireless device/machine. This interfering object or condition may be relatively slow-moving or slowly changing, such that retransmission from the same APU may experience similar conditions. While soft combining techniques like Chase combining or incremental redundancy may overcome these conditions, further improvements in a distributed wireless system may be gained by modifying conventional re-transmissions in such a way as to take advantage of spatial diversity.

In embodiments of the methods and apparatuses disclosed herein, then, an initial transmission to a wireless device is performed by an APU that has been identified as the best candidate for communication to the wireless device, e.g., according to signal-quality or quality-of-service (QoS) metrics maintained for each APU/wireless device combination. According to these embodiments, when the wireless device is unable to successfully decode a downlink and requests a retransmission, the CPU can request an APU having the second-best QoS metric to perform the retransmission. If the wireless device again requests a retransmission, the CPU can request the APU having the third-best QoS metric to perform the second retransmission. This can be repeated until the wireless device acknowledges that it has successfully decoded the transmission, or until the CPU decides to stop further retransmissions, e.g., after a predefined number of retransmissions have occurred, or when the next-best QoS metric is worse than the best QoS metric by a predetermined quantity, etc. At this point, the CPU may start over with the APU having the best QoS metric, in some embodiments.

A key benefit of this approach to re-transmissions is that each transmission from a new physical location will result in a new channel from the base station to the device/machine. This will result in a spatial diversity gain. Diversity gain is an efficient way to suppress block error rate (BLER) from slow fading channels, or avoid other fast changes in the radio channel.

As noted above, the APUs are connected in series, with each APU obtaining from its upstream serial interface the data it needs from the CPU and forwarding other information downstream to the next APU. Data for a given downlink transmission to a UE can be forwarded to and saved by all the APUs in the chain, in some embodiments, so that each APU already has the data it needs in the event that the APU is asked to perform a transmission or re-transmission to the wireless device. The re-transmission techniques described above thus do not require that the CPU re-send the downlink data on the downstream serial links for each re-transmission. Rather, it only needs to send a command instructing the appropriate APU or APUs to perform the re-transmission. Thus, the re-transmission techniques described here do not substantially increase the required capacity of the downstream serial links.

While these techniques require that each APU receive and buffer the downlink data for each downlink transmission, whether or not the APU ultimately transmits the data, the amount of buffering (and the corresponding buffer size) can be limited, since the data is scrapped after a successful decoding in the machine/device.

Figure 6:
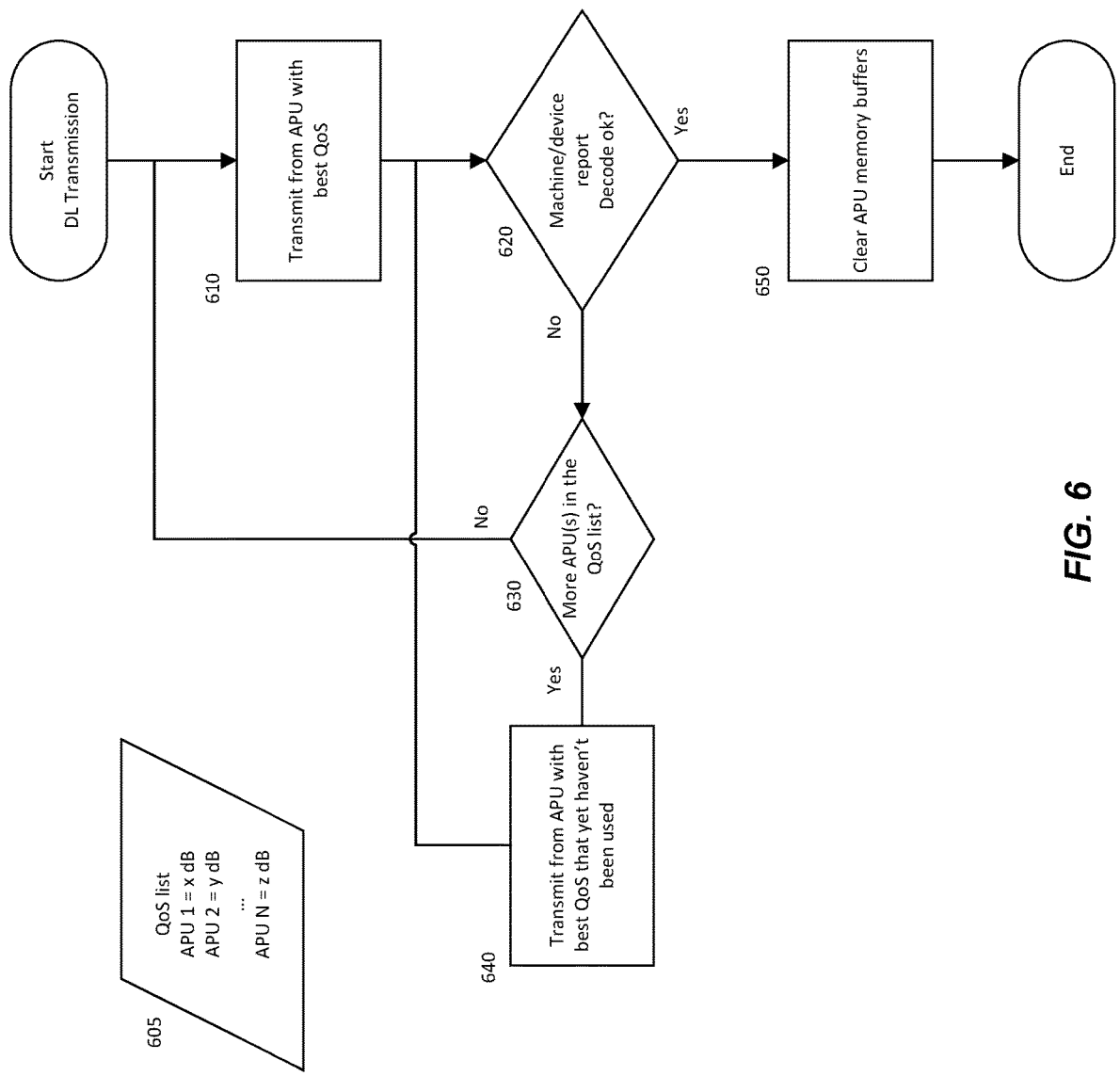
FIG. 6 is a process flow diagram illustrating an example technique, according to some embodiments.

FIG. 6 is a process flow diagram illustrating an example method, according to the technique described in general terms above. The illustrated method begins with the CPU having an ordered list of measured signal quality or estimated path losses associated with a wireless device of interest. This list is shown at block 605, where it is labeled a "QoS list" and where there is a signal quality (or path loss) value for each of N APUs. For the purposes of this discussion, it is assumed that the quantity associated with APU 1 represents the "best" quantity, in that it is the highest signal quality or the lowest estimated pathloss from among the APUs. In the figure, this best quantity is referred to as the "best QoS." In the illustrated example, it is assumed that APU 2 has the second best QoS; APU 3 has the third best QoS, and so on.

As shown at block 610, the actions taken begin with transmitting a downlink transmission to a wireless device from the APU with the best QoS. More specifically, the CPU may instruct the APU with the best QoS (as determined by the list maintained by the CPU) to transmit a block of data to the wireless device. In the illustrated example, this is APU 1. This instruction may accompany or follow the transfer of the block of data or a corresponding representation of the transmission to APU 1, via the chain of serial links interconnecting the CPU and the APUs. As noted above, the data corresponding to this downlink transmission may be received and stored by all of the APUs in the chain, whether or not they are ultimately instructed to perform the downlink transmission.

As shown at block 620, the CPU next determines whether the wireless device has reported that it has successfully decoded the downlink transmission, e.g., by signaling an acknowledgement (ACK) or negative acknowledgement (NACK). If it has, the stored data corresponding to the downlink transmission may be cleared from each APU's buffers—this may be in response to an instruction from the CPU, in some embodiments.

If the wireless device did not successfully decode the first transmission, on the other hand, a retransmission is needed. As shown at block 630, the CPU considers whether there are more qualified APUs in the QoS list that have not yet attempted the downlink transmission. In some embodiments or instances, this may be as simple as determining whether there is another next-best APU in the list. In others, this may involve evaluating the QoS associated with the APU having the next-best APU (in this case, APU 2) to determine whether the QoS meets some predetermined condition, e.g., being above a particular level, or being no more than a predetermined amount worse than the best QoS, or being among the APUs with the best N QoS parameters, where N is a predetermined number. If there is another APU in the QoS list, the downlink transmission is performed by the APU having the best QoS among those APUs that have not yet been used for this downlink transmission, as shown at block 640. Once again, this may be in done in response to an explicit instruction from the CPU. Notably, the CPU does not have to send the downlink data again, as it was previously stored by the APUs.

After the retransmission is performed, the procedure returns to block 620, to determine whether this transmission is successfully decoded. Again, if it was, the APU's memory buffers are cleared, as shown at block 650, and the procedure ends. In many cases, the wireless device's combining of the original transmission and the first re-transmission will produce an effective signal-to-noise-plus-distortion ratio (SNDR) that is high enough for a successful decoding of the downlink transmission. However, in some cases this second decoding attempt will also fail, e.g., when a momentary fade obscures the UE's signal from both the first and second best APUs. In this case, the steps shown at blocks 630, 640, and 620 may repeat until there are no longer any more APUs (or qualified APUs) in the QoS list. At this point, as shown by the "No" path leading out of block 630, the entire procedure may be repeated, starting with the APU having the best QoS.

Figures 7, 8, 9:
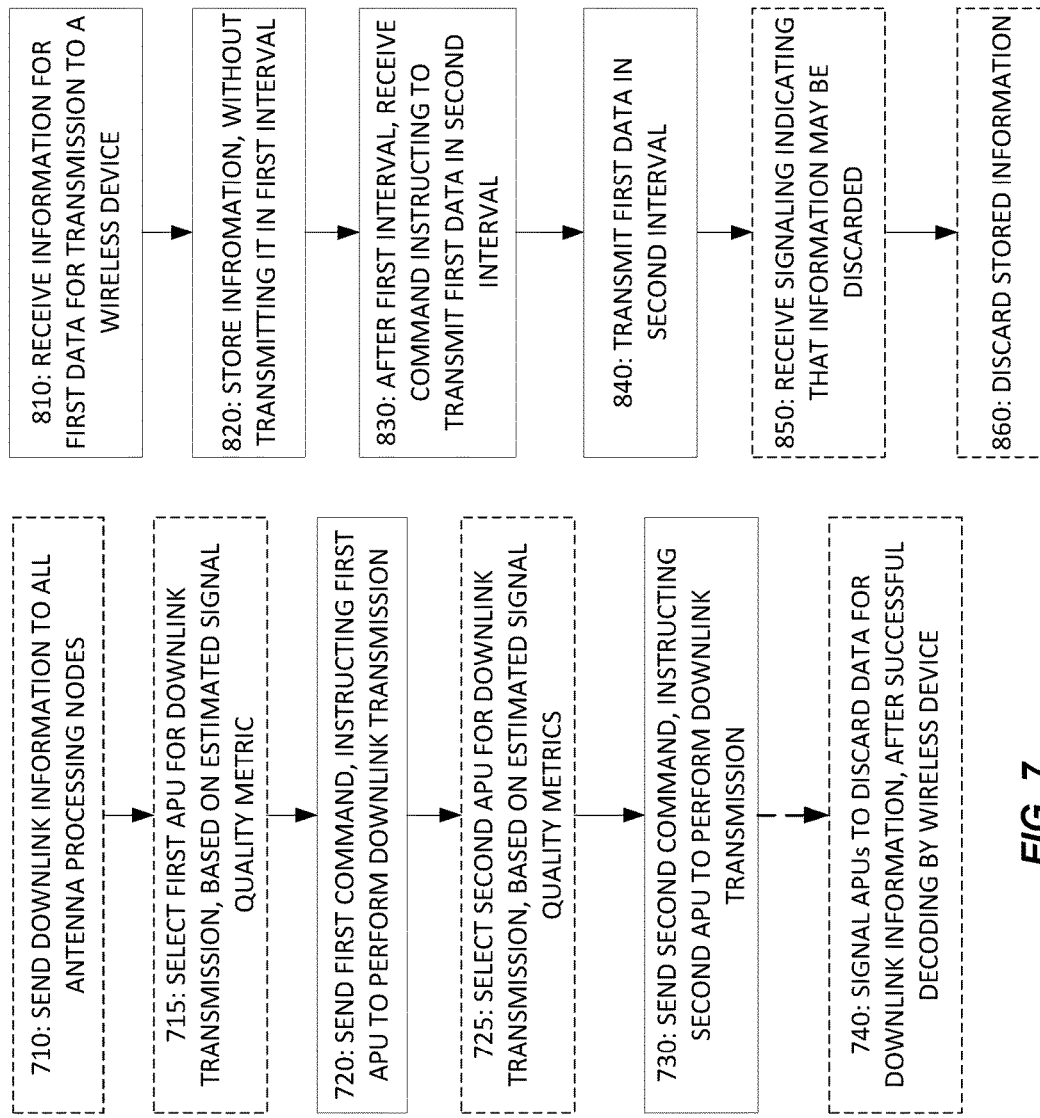
FIG. 7 is a process flow diagram illustrating an example method carried out by a controlling node, according to some embodiments.
FIG. 8 is a process flow diagram of an example method carried out by an antenna processing node, according to some embodiments.
FIG. 9 is a process flow diagram of another example method carried out by an antenna processing node, according to some embodiments.

FIG. 7 is a process flow diagram illustrating an example method according to the techniques described above, in this case focusing on the operations carried out by a controlling node of a distributed wireless system that comprises the controlling node and two or more antenna processing nodes communicatively coupled to the controlling node but spatially separated from each other and from the controlling node. Again, here the terms "controlling node" and "antenna processing nodes" are used interchangeably with the terms "CPU" and "APU," respectively.

The method illustrated in FIG. 7 includes, as shown at block 720, sending a first command to a first one of the two or more antenna processing nodes, the first command instructing the first one of the two or more antenna processing nodes to transmit first data to a wireless device. This may be preceded, in some embodiments, by selecting the first one of the two or more antenna processing nodes based on an estimated signal quality metric corresponding to the wireless device for each of the two or more antenna processing nodes, as shown at block 715. This may comprise, for example, determining that the first one of the two or more antenna processing nodes has a best estimated signal quality metric corresponding to the wireless device, out of all of the antenna processing nodes.

As shown at block 730, in response to a determination by the controlling node that the wireless device has not successfully decoded the first data, the controlling node sends a second command to a second one of the two or more antenna processing nodes. This second command instructs the second one of the two or more antenna processing nodes to transmit the first data to the wireless device. Once again, this may be preceded in some embodiments, by the step of selecting the second one of the two or more antenna processing nodes based on estimated signal quality metrics, e.g., by determining that the first one of the two or more antenna processing nodes has a the second one of the two or more antenna processing nodes has a next best estimated signal quality metric for the wireless device, compared to the first one of the antenna processing nodes. The determining that the wireless device has not successfully decoded the first data may comprise, in some embodiments receiving an indication of such from the first one of the two or more antenna processing nodes; this indication may comprise a request for retransmission or a "NACK" sent by the wireless device and forwarded to the controlling node by the first one of the antenna processing nodes, in some embodiments.

As discussed above, in some instances a single re-transmission may not be adequate, in that the wireless device is still unable to successfully decode the downlink transmissions. In these instances, in some embodiments, the method may further comprise determining, after sending the second command, that the wireless device has again been unable to successfully decode the first data, and sending a third command to a third one of the two or more antenna processing nodes, where the third command instructs the third one of the two or more antenna processing nodes to transmit the first data to the wireless device. This is not illustrated in FIG. 7; it will be appreciated that this is simply a repetition of the operation shown in block 730, but for the "next-best" antenna processing node.

The method illustrated in FIG. 7 further comprises the step of signaling the two or more antenna processing nodes, after determining that the wireless device has successfully decoded the first data, where this signaling indicates that information corresponding to the first data may be discarded. This is shown at block 740.

As discussed above, the techniques described herein need not substantially burden the serial links connecting the controlling node to the antenna processing nodes, since the downlink information to be transmitted to the wireless device can be sent by the controlling node just once, to the first antenna processing node in the chain, with that antenna processing node and each subsequent node in the chain forwarding the downlink information to the next antenna processing node. Thus, in some embodiments, the method shown in FIG. 7 begins with the step of, prior to sending the first command, sending information corresponding to the first data to every one of the two or more antenna processing nodes. This is shown at block 710. In other embodiments, this information might be sent along with the first command.

FIG. 8 is a process flow diagram illustrating a method, complementing that shown in FIG. 7, as carried out in an antenna processing node of a distributed wireless system that comprises a controlling node, the antenna processing node, and one or more additional antenna processing nodes. As in the previous examples, each of the antenna processing nodes is communicatively coupled to the controlling node but spatially separated from each other and from the controlling node. This particular method corresponds to an instance where the antenna processing node does not perform the original transmission of first data to a wireless device, but performs a re-transmission.

The method shown in FIG. 8 begins with the antenna processing node receiving, from the controlling node, information corresponding to first data for transmission to a wireless device in a first interval. This is shown at block 810. The method further comprises storing the information corresponding to the first data, without transmitting it to the wireless device in the first interval, as shown at block 820. As shown at block 830, the antenna processing node receives, after the first interval has passed, a command instructing the antenna processing node to transmit the first data to the wireless device in a second interval. The antenna processing node then transmits the first data to the wireless device in the second interval, as shown at block 840.

In some embodiments, the antenna processing node may be configured to automatically discard the information for the first transmission, after performing the re-transmission. In other embodiments, the antenna processing node may instead wait until it receives signaling from the controlling node indicating that the information may be discarded, as shown at block 850, before discarding the information, as shown at block 860.

FIG. 9 is a process flow diagram illustrating another method complementing that shown in FIG. 7, again as carried out in an antenna processing node of a distributed wireless system that comprises a controlling node, the antenna processing node, and one or more additional antenna processing nodes. This particular method corresponds to an instance where the antenna processing node receives data corresponding to a downlink transmission to a wireless device, but neither performs the original transmission or a re-transmission of the data. This method might be performed at the same time the method of FIG. 8 is being performed by a different antenna processing node in the same chain, or by the same antenna processing node at a different time, for instance.

The method of FIG. 910 begins, as shown at block 910, with the antenna processing node receiving, from the controlling node, information corresponding to first data for transmission to a wireless device in a first interval. The antenna processing node stores the information corresponding to the first data, without transmitting it to the wireless device in the first interval, as shown at block 920. After the first interval has passed, the antenna processing node receives signaling indicating that information corresponding to the first data may be discarded, as shown at block 930. Finally, as shown at block 940, the antenna processing node discards the stored information corresponding to the first data, without transmitting it to the wireless device.

Figure 10:
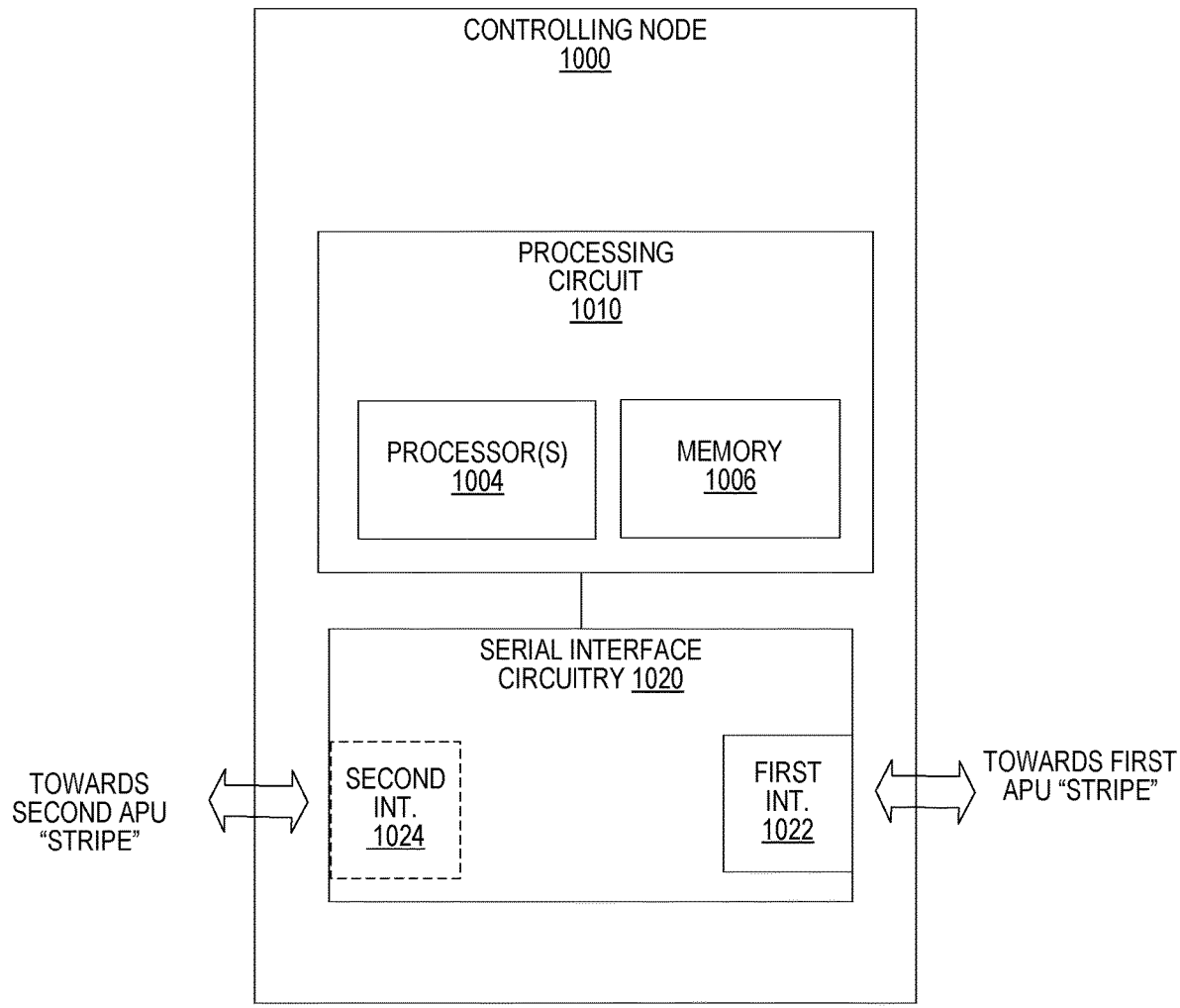
FIG. 10 is a block diagram of an example controlling node, according to some embodiments.

FIG. 10 is a block diagram illustrating an example controlling node apparatus 1000, according to some embodiments. Controlling node apparatus 1000, which may also be referred to as simply controlling node 1000, includes a processing circuit 1010, which in turn includes one or more processors 1004, controllers, or the like, coupled to memory 1006, which may comprise one or several types of memory, such as random-access memory, read-only memory, flash memory, etc. Stored in memory 1006 may be computer program code for execution by processor(s) 1004, including program code configured to cause the controlling node 1000 to carry out any one or more of the techniques described herein, such as the methods discussed above in connection with FIG. 7. It will be appreciated that the computer program code, whether instantiated in memory 1006 or stored or communicated elsewhere, may be regarded as a "computer program product," and that embodiments of the presently disclosed invention include such computer program products.

Controlling node 1000 further comprises serial interface circuitry 1020 operatively coupled to the processing circuit 1010. Serial interface circuitry 1020 includes at least one serial interface 1022 configured to transmit data to and receive data from one or several antenna processing nodes connected in series, via a serial link connected to the serial interface 1022. In some embodiments, the serial interface circuitry 1020 may comprise a second serial interface 1024, configured to transmit data to and receive data from a second set of antenna processing nodes connected in series, via a serial link connected to the second serial interface 1024. Thus, the controlling node 1000 may be able to separately control two (or more) "stripes" or "chains" of antenna processing nodes, through respective serial interfaces.

While not shown in FIG. 10, in some embodiments the controlling node 1000 may be collocated with or include an antenna processing node or comparable functionality, e.g., as shown in FIG. 4. From a functional standpoint, this collocated antenna processing node functionality may be treated in the same manner as other antenna processing nodes in a series.

Referring again to FIG. 4, this figure is a block diagram illustrating an example antenna processing node 400, according to some embodiments. Antenna processing node 400 includes radio circuitry 410 and antennas 415, processing circuit 420, and serial interface circuitry 430, which includes a first serial interface 432, facing "upstream" towards a controlling node, as well as a second serial interface 434, facing "downstream," towards one or more subsequent antenna processing nodes. It will be appreciated that when antenna processing node is the last antenna processing node in a chain, the second serial interface 434 is unused.

Radio circuitry 410 includes receive (RX) and transmit (TX) functionality for communicating with one or more wireless devices via antennas 415. For downlink communications, i.e., radio communications to one or more wireless devices, the radio circuitry 410 includes TX circuitry 414 configured to receive baseband information relayed to the radio circuitry 410 from a controlling node, via the upstream serial interface 432 and the processing circuit 420. TX circuitry 414 includes upconverter circuits, power amplifier circuits, and filter circuits to convert this baseband information to radio frequency and condition it for transmission to one or more wireless devices. For uplink communications, i.e., radio communications from one or more wireless devices, the radio circuitry 410 includes RX circuitry 412 configured to receive wireless transmissions via antennas 415, amplify, filter, and downconvert the received transmissions, and sample the downconverted transmissions to obtain soft information corresponding to the received wireless transmission. This soft information may be in the form of I-Q samples, for instance, and may be interchangeably referred to as soft bits or soft bit information.

Processing circuit 420 includes one or more processors 424, controllers, or the like, coupled to memory 426, which may comprise one or several types of memory, such as random-access memory, read-only memory, flash memory, etc. Stored in memory 426 may be computer program code for execution by processor(s) 424, including program code configured to control the radio circuitry 410 and serial interface circuitry 430 and to cause the antenna processing node 400 to carry out any one or more of the techniques described herein, such as the methods discussed above in connection with FIGS. 8 and 9. Again, it will be appreciated that the computer program code, whether instantiated in memory 426 or stored or communicated elsewhere, may be regarded as a "computer program product," and that embodiments of the presently disclosed invention include such computer program products.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method, in a controlling node of a distributed wireless system that comprises the controlling node and two or more antenna processing nodes communicatively coupled to the controlling node but spatially separated from each other and from the controlling node, the method comprising:
sending a first command to a first one of the two or more antenna processing nodes, the first command instructing the first one of the two or more antenna processing nodes to transmit first data to a wireless device; and
responsive to determining that the wireless device has not successfully decoded the first data, sending a second command to a second one of the two or more antenna processing nodes, the second command instructing the second one of the two or more antenna processing nodes to transmit the first data to the wireless device.

2. The method of claim 1, further comprising:

determining, after sending the second command, that the wireless device has again been unable to successfully decode the first data and, in response,
sending a third command to a third one of the two or more antenna processing nodes, the third command instructing the third one of the two or more antenna processing nodes to transmit the first data to the wireless device.

3. The method of claim 1, wherein the method further comprises:
after determining that the wireless device has successfully decoded the first data, signaling the two or more antenna processing nodes, said signaling indicating that information corresponding to the first data may be discarded.

4. The method of claim 1, the method further comprising selecting the first one of the two or more antenna processing nodes based on an estimated signal quality metric corresponding to the wireless device for each of the two or more antenna processing nodes.

5. The method of claim 4, wherein selecting the first one of the two or more antenna processing nodes comprises determining that the first one of the two or more antenna processing nodes has a best estimated signal quality metric corresponding to the wireless device, and wherein the method further comprises selecting the second one of the two or more antenna processing nodes by determining that the second one of the two or more antenna processing nodes has a next best estimated signal quality metric for the wireless device.

6. The method of claim 1, the method further comprising, prior to sending the first command, sending information corresponding to the first data to every one of the two or more antenna processing nodes.

7. The method of claim 1, wherein determining that the wireless device has not successfully decoded the data comprises receiving, from the first one of the two or more antenna processing nodes, an indication that the wireless device failed to successfully receive the first data transmitted by the first one of the two or more antenna processing nodes.

8. A method, in an antenna processing node of a distributed wireless system that comprises a controlling node, the antenna processing node, and one or more additional antenna processing nodes, each of the antenna processing nodes being communicatively coupled to the controlling node but spatially separated from each other and from the controlling node, the method comprising:
receiving, from the controlling node, information corresponding to first data for transmission to a wireless device in a first interval;
storing the information corresponding to the first data, without transmitting it to the wireless device in the first interval;
receiving, after the first interval has passed, a command instructing the antenna processing node to transmit the first data to the wireless device in a second interval; and
transmitting the first data to the wireless device in the second interval.

9. The method of claim 8, further comprising:
receiving signaling indicating that information corresponding to the first data may be discarded; and
discarding the stored information corresponding to the first data.

10. A method, in an antenna processing node of a distributed wireless system that comprises a controlling node, the antenna processing node, and one or more additional antenna processing nodes, each of the antenna processing nodes being communicatively coupled to the controlling node but spatially separated from each other and from the controlling node, the method comprising:

receiving, from the controlling node, information corresponding to first data for transmission to a wireless device in a first interval;

storing the information corresponding to the first data, without transmitting it to the wireless device in the first interval;

receiving, after the first interval has passed, signaling indicating that information corresponding to the first data may be discarded; and discarding the stored information corresponding to the first data, without transmitting it to the wireless device.

11. A controlling node apparatus for use in a distributed wireless system that comprises the controlling node and two or more antenna processing nodes communicatively coupled to the controlling node but spatially separated from each other and from the controlling node, the controlling node apparatus comprising:

serial interface circuitry configured to send data to and receive data from the antenna processing nodes; and a processing circuit operatively coupled to the serial interface circuitry and configured to:

send a first command to a first one of the two or more antenna processing nodes, the first command instructing the first one of the two or more antenna processing nodes to transmit first data to a wireless device; and responsive to determining that the wireless device has not successfully decoded the first data, send a second command to a second one of the two or more antenna processing nodes, the second command instructing the second one of the two or more antenna processing nodes to transmit the first data to the wireless device.

12. The controlling node apparatus of claim 11, wherein the processing circuit is further configured to:

determine, after sending the second command, that the wireless device has again been unable to successfully decode the first data and, in response, send a third command to a third one of the two or more antenna processing nodes, the third command instructing the third one of the two or more antenna processing nodes to transmit the first data to the wireless device.

13. The controlling node apparatus of claim 11, wherein the processing circuit is further configured to signal the two or more antenna processing nodes, after determining that the wireless device has successfully decoded the first data, said signaling indicating that information corresponding to the first data may be discarded.

14. The controlling node apparatus of claim 11, wherein the processing circuit is further configured to select the first one of the two or more antenna processing nodes based on an estimated signal quality metric corresponding to the wireless device for each of the two or more antenna processing nodes.

15. The controlling node apparatus of claim 14, wherein the processing circuit is configured to select the first one of the two or more antenna processing nodes by determining that the first one of the two or more antenna processing nodes has a best estimated signal quality metric corresponding to the wireless device, and wherein the processing circuit is further configured to select the second one of the two or more antenna processing nodes by determining that the second one of the two or more antenna processing nodes has a next best estimated signal quality metric for the wireless device.

16. The controlling node apparatus of claim 11, wherein the processing circuit is further configured to send information corresponding to the first data to every one of the two or more antenna processing nodes, prior to sending the first command.

17. The controlling node apparatus of claim 11, wherein the processing circuit is configured to determine that the wireless device has not successfully decoded the data by receiving, from the first one of the two or more antenna processing nodes, an indication that the wireless device failed to successfully receive the first data transmitted by the first one of the two or more antenna processing nodes.

18. An antenna processing node, for use in a distributed wireless system that comprises a controlling node, the antenna processing node, and one or more additional antenna processing nodes, each of the antenna processing nodes being communicatively coupled to the controlling node but spatially separated from each other and from the controlling node, wherein the antenna processing node comprises:

radio circuitry configured to communicate wirelessly with one or more wireless devices;

serial interface circuitry configured to communicate over a serial link with the controlling node; and a processing circuit operatively coupled to the serial interface circuitry and configured to:

receive, from the controlling node, information corresponding to first data for transmission to a wireless device in a first interval;

store the information corresponding to the first data, without transmitting it to the wireless device in the first interval;

receive, after the first interval has passed, a command instructing the antenna processing node to transmit the first data to the wireless device in a second interval; and transmit the first data to the wireless device in the second interval.

19. The antenna processing node of claim 18, wherein the processing circuit is further configured to:

receive signaling indicating that information corresponding to the first data may be discarded; and discard the stored information corresponding to the first data.

20. An antenna processing node, for use in a distributed wireless system that comprises a controlling node, the antenna processing node, and one or more additional antenna processing nodes, each of the antenna processing nodes being communicatively coupled to the controlling node but spatially separated from each other and from the controlling node, wherein the antenna processing node comprises:

radio circuitry configured to communicate wirelessly with one or more wireless devices;

serial interface circuitry configured to communicate over a serial link with the controlling node; and a processing circuit operatively coupled to the serial interface circuitry and configured to:

receive, from the controlling node, information corresponding to first data for transmission to a wireless device in a first interval;

store the information corresponding to the first data, without transmitting it to the wireless device in the first interval;

receiving, after the first interval has passed, signaling indicating that information corresponding to the first data may be discarded; and discarding the stored information corresponding to the first data, without transmitting it to the wireless device.

\* \* \* \* \*